(12) United States Patent
Salmela et al.

(10) Patent No.: US 12,720,313 B2
(45) Date of Patent: Aug. 25, 2026

(54) METHODS AND MEANS FOR PROVIDING ACCESS TO EXTERNAL NETWORKS

(71) Applicant: Telefonaktiebolaget LM Ericsson (publ), Stockholm (SE)

(72) Inventors: Patrik Salmela, Espoo (FI); Mohit Sethi, Helsinki (FI); Andrey Shorov, Vantaa Uusimaa (FI); Vesa Lehtovirta, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 295 days.

(21) Appl. No.: 18/568,915

(22) PCT Filed: Jun. 15, 2021

(86) PCT No.: PCT/EP2021/066060
§ 371 (c)(1),
(2) Date: Dec. 11, 2023

(87) PCT Pub. No.: WO2022/262948
PCT Pub. Date: Dec. 22, 2022

(65) Prior Publication Data

US 2024/0187860 A1 Jun. 6, 2024

(51) Int. Cl.

| | |
|---|---|
| ***H04W 12/30*** | (2021.01) |
| ***H04W 12/06*** | (2021.01) |
| ***H04W 12/08*** | (2021.01) |

(52) U.S. Cl.
CPC .......... *H04W 12/08* (2013.01); *H04W 12/06* (2013.01)

(58) Field of Classification Search
CPC ... H04W 12/08; H04W 12/06; H04W 12/062; H04L 63/0892; H04L 67/141
USPC ........................................................ 455/411
See application file for complete search history.

(56) References Cited

U.S. PATENT DOCUMENTS

2021/0306854 A1* 9/2021 Gundavelli ............ H04W 8/24

FOREIGN PATENT DOCUMENTS

EP 3459278 A1 3/2019
WO WO-2018137873 A1 * 8/2018 .......... H04L 63/164

OTHER PUBLICATIONS

International Search Report and Written Opinion of the International Searching Authority, PCT/EP2021/066060, mailed Feb. 10, 2022, 11 pages.
ETSI TS 129 61 v8.1.0 (Feb. 2009); European Communications Standards Institute; Digital cellular telecommunications system (Phase 2+); Universal Mobile Telecommunications System (UMTS); LTE; Interworking between the Public Lane Mobile Network (PLMN) supporting packet based services and Packet Data Networks (PDN) (3GPP TS 29.061 version 8.1.0 Release 8), 135 pages.

* cited by examiner

*Primary Examiner* — Tanmay K Shah
(74) *Attorney, Agent, or Firm* — Sonoda & Kobayashi Intellectual Property Law; Sarvajit S. Patil

(57) ABSTRACT

Methods and means for providing a UE access to an external network are disclosed. In the methods it is determined that a that a secondary authentication procedure is required in order for the UE to access the external network, and then providing, to an entity of the external network, information relating to the UE. The UE related information is included in a message in relation to the secondary authentication procedure between the UE and the entity of the external network.

20 Claims, 3 Drawing Sheets

METHODS AND MEANS FOR PROVIDING ACCESS TO EXTERNAL NETWORKS

CROSS REFERENCE TO RELATED APPLICATIONS

This application is a 35 U.S.C. § 371 national stage application of PCT International Application No. PCT/EP2021/066060 filed on Jun. 15, 2021, the disclosure and content of which is incorporated by reference herein in its entirety.

TECHNICAL FIELD

Embodiments presented herein relate to methods, a network node, an entity, computer programs, and a computer program product for providing a user equipment access to a network.

BACKGROUND

A 5G Core Network (5GC) is the heart of a 5G mobile network. The 5GC can be interconnected with external data networks, such as the Internet, and with external networks of e.g. enterprises. In the latter case, typically, not everyone is allowed access, and there is often a secure network protocol suite, e.g. Internet Protocol Security (IPsec), between the 5GC network and the external network. The IPsec, or some other secure tunnel, authenticates and encrypts packets of data, which enables both endpoints to trust each other based on negotiated and trusted mutually authenticated security means. The external network is then configured to trust traffic coming from the IPsec tunnel established with the trusted 5GC.

In order to limit User Equipments (UEs) to those allowed to send data through the IPsec tunnel towards the external private network, the 5GC can assign the external network a Data Network Name (DNN), which can be private. Public DNNs are also used, e.g. for internet access the DNN is typically "internet". The DNN can be seen as an identifier of the network that the externally facing interface of a User Plane Function (UPF) connects to for a specific Packet Data Units (PDU) session. An UPF can serve multiple DNNs. The DNN is bound to the PDU session established for a UE and/or subscription (UE/subscription). The UE/subscription can establish a PDU session only to those DNNs that are configured for that particular subscription, i.e. the 5GC performs access control based on the subscription information and only allows subscriptions configured with a specific DNN to create a PDU session for the DNN.

In order to further enhance the access control for the DNN, the external network can also be involved through a Secondary Authentication (SA). When enabled for the DNN, the 5GC will not allow establishing of a PDU session with the specific DNN unless also the SA has been successfully performed towards the external network. The SA is basically an Extensible Authentication Protocol (EAP) method exchange between the UE and an Authentication, Authorization and Accounting (AAA) server. The AAA server is typically located in the external network, and the EAP method requires external network credentials of the UE, i.e. only UEs that also possess valid credentials for the external network can establish a PDU session with the DNN. The EAP exchange is run with a Session Management Function (SMF) in the 5GC acting as an EAP authenticator and (typically) the AAA server in the external network acting as an EAP server.

With 5G the concept of private 5G networks has been introduced, the 5G technology allowing the building of such private 5G networks. These non-public networks (NPN) can be deployed in different ways. A standalone NPN (SNPN) is basically a standalone 5G network, that is not relying on network functions (NFs) provided by a Public Land Mobile Network (PLMN), but possibly utilizing Radio Access Network (RAN) of the PLMN. The entity operating the SNPN may, for instance, be an enterprise. Alternatively, the NPN may be deployed by at least partly utilizing the infrastructure of the PLMN, and such NPN is called a public network integrated NPN (PNI-NPN). In this case the subscription credentials are managed by the PLMN. The PNI-NPN may be deployed as a network slice in the PLMN network or as an external data network in which some of the NFs of the NPN can be run.

In the case of a PNI-NPN in which the NPN is deployed as an external data network, in addition to a primary registration/authentication, an SA may be used for authenticating and authorizing the UE to access the NPN via the PLMN. If network slicing is used, a Network Slice-Specific Authentication and Authorization (NSSAA) may be used for authorizing access to the NPN slice. The NSSAA may, for instance, be performed using an external AAA server, and an EAP based authentication.

5G Local Area Network (LAN) type of services improve regular LAN with 5G capabilities, such as performance, long-distance access, mobility, security etc., and allow a restricted set of UEs to communicate amongst each other. In providing 5G LAN service, a 5G System (5GS) supports optimized routing by enabling support for local switching at the UPF without having to traverse the data network for UE-UE communication when the same UPF serves the both UEs. However, the 5G LAN may have a DNN associated with it, i.e., the SA may be performed to authenticate and authorize the UE accessing such DNN since no 5G-LAN specific authentication or authorization has been defined [3GPP TS 23.501, 33.501].

Thus, the SA may be used for authentication/authorization to external data networks, to PNI-NPN, as well as to 5G LAN to name a few.

EAP is a framework with support for multiple authentication methods and can run directly over the link-layer without IP connectivity. In EAP, the entity requiring authentication is termed as the EAP authenticator while the other end point is referred to as the EAP peer. EAP allows the use of a backend authentication server with the authenticator simply behaving as a pass-through. The entity where EAP authentication terminates is referred to as the EAP server. Thus, the EAP server can be part of the authenticator or the backend server.

EAP is often deployed together with a protocol for authentication, authorization, and accounting (AAA), such as, for instance, Remote Authentication Dial-In User Service (RADIUS) and DIAMETER (enhanced RADIUS). When EAP is used with AAA protocols, the authenticator always acts as a pass-through. In such deployments, the AAA server, EAP server, and backend authentication server refer to the same entity. In the 5G context, when secondary authentication is used, the SMF acts as the authenticator and uses RADIUS or DIAMETER to transport EAP messages to the AAA server (which may be located in the external network).

Nowadays, enterprises require fine-grained authorization decisions that make it possible to run precise access control to specific internal applications. In order to run precise access control, it is not enough to have an authentication in place for authorization. Modern network security approaches, e.g., Zero Trust Network Access (ZTNA), use security policies that demands additional attributes by a service consumer in order to provide access to resources that the consumer has been granted.

SUMMARY

Current 3GPP networks do not support the sharing of potentially helpful information with an external network that may be required by access control mechanisms, e.g., within implementation of ZTNA paradigm. For example, the SA is used to verify whether a UE is allowed to access an external network via its DNN, and thus only validates that the UE possesses credentials to access the external network.

However, this does not allow the making of fine-grained authorization decisions because the 3GPP network does not supply external AAA servers with relevant environmental attributes; some UEs/credentials, while valid, might still not be allowed to access the network under specific circumstances, e.g., dependent on time of day, or location from where the UE is connecting. The external network can of course know the time of day, but the location of the UE is unknown for the external network because the 3GPP network initiates the SA procedure via Home SMF (H-SMF), i.e., the external AAA does not know the UE location even in the roaming scenario. The UE could of course share its location by messages on the top of 3GPP protocols, but a malicious or compromised UE might modify this information to fit access control requirements. The location of the UE can be a significant piece of information in various use cases.

One such use case is when geofencing is needed. UEs may be allowed to access external network only while being in the same country, or even smaller geographical region as the certain private or public land mobile network (PLMN), or even registration area (RA). For example, a smart factory might want to keep devices from connecting unless close enough to the factory that it is likely that they are on premises. As another example, some information might not be allowed to exit the country where the data is stored e.g. due to home country data protection regulations.

Another such use case is that some regions or countries might be blacklisted. If the UE is in one of these countries it should not be allowed to access the external network. Instead of a blacklist, a white list may be used, the white list listing countries from where the UE is allowed to access an external network.

When a UE connects to an external network, unless local breakout is used (which is uncommon) in a roaming scenario, the external network sees the UE as connecting from the home network of the UE/subscription. This is based on SMF/UPF address from where EAP messages of secondary authentication are received. Thus, the external network would not know if the UE is connected to its home network or if it is roaming and thus in some other country or region. This makes it impossible to make fine-grained authorization decisions with the help of 3GPP network. This is forcing enterprises to run additional, often non-optimal, security solutions on top of the 3GPP network, increasing capital expenditure (CAPEX) and operating expenses (OPEX).

Hence, there is a need for methods and means for enabling improved authorization decisions for access to an external network. Further, there is a need for enabling fine-grained, even user-tailored authorization decisions. Further still, there is a need for cost-efficient solutions in these regards.

An objective of embodiments herein is to enable improved authorization decisions to be made for accessing external networks.

Another objective is to enable fine-grained authorization decisions, even down to a user equipment/user-specific authorization decision.

Another objective of embodiments herein is to enable such authorization decisions in a cost-efficient way.

According to a first aspect there is presented a method for providing a user equipment (UE) access to an external network. The method is performed in a network node of a Mobile Network Operator (MNO) network and comprises: determining that a secondary authentication procedure is required in order for the UE to access the external network, and providing, to an entity of the external network, information relating to the UE, the UE related information being included in a message in relation to the secondary authentication procedure between the UE and the entity of the external network.

According to a second aspect there is provided a network node of an MNO network for providing UE access to an external network. The network node is configured to: determine that a secondary authentication procedure is required in order for the UE to access the external network, and provide, to an entity of the external network, information relating to the UE, the UE related information being included in a message in relation to the secondary authentication procedure between the UE and the entity of the external network According to a third aspect there is presented a computer program for providing a UE access to an external network. The computer program comprises computer program code which, when run on processing circuitry of network node of an MNO network, causes the network node to perform a method according to the first aspect.

According to a fourth aspect there is provided a method for providing a UE access to an external network. The method is performed in an entity of the external network and comprises: receiving, from a network node of an MNO network in which the UE is registered, information relating to the UE, the UE related information being included in a message in relation to a secondary authentication procedure between the UE and the entity of the external network.

According to fifth aspect there is provided an entity for providing a UE access to an external network. The entity is configured to: receive, from a network node of an MNO network in which the UE is registered, information relating to the UE, the UE related information being included in a message in relation to a secondary authentication procedure between the UE and the entity of the external network.

According to a sixth aspect there is presented a computer program for providing a UE access to an external network. The computer program comprises computer program code which, when run on processing circuitry of entity of an external network, causes the entity to perform a method according to the fourth aspect.

According to a seventh aspect there is presented a computer program product comprising a computer program according to at least one of the third aspect and the sixth aspect and a computer readable storage medium on which the computer program is stored. The computer readable medium could be a non-transitory computer readable storage medium.

Advantageously, the embodiments herein, enable improved authorization decisions to be made for accessing external networks. An EAP/AAA server, or the external network, is enabled to provide such improved authorization decision regarding whether to allow a UE access to the external network based on additional information provided by the 3GPP network. For example, obtaining environmental attributes allow the external network to enable Attribute-Based Access Control/Policy-Based Access Control (ABAC/PBAC) or other fine-grained access control solutions to ensure fine-grained authorization decisions.

Advantageously, the embodiments herein enable optimization of an authorization procedure by removing the need for the exchange of additional information necessary for authorization decisions on a user-plane (UP) level.

Advantageously, the embodiments herein enable fine-grained authorization decisions, even down to a user equipment/user-specific authorization decision.

Advantageously, the embodiments herein enable reduced costs for security issues and specific, by enabling removing the need for enterprises to buy and use additional hardware and software that works on the top of the 3GPP network to support the authorization decision.

Further objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

Figure 1:
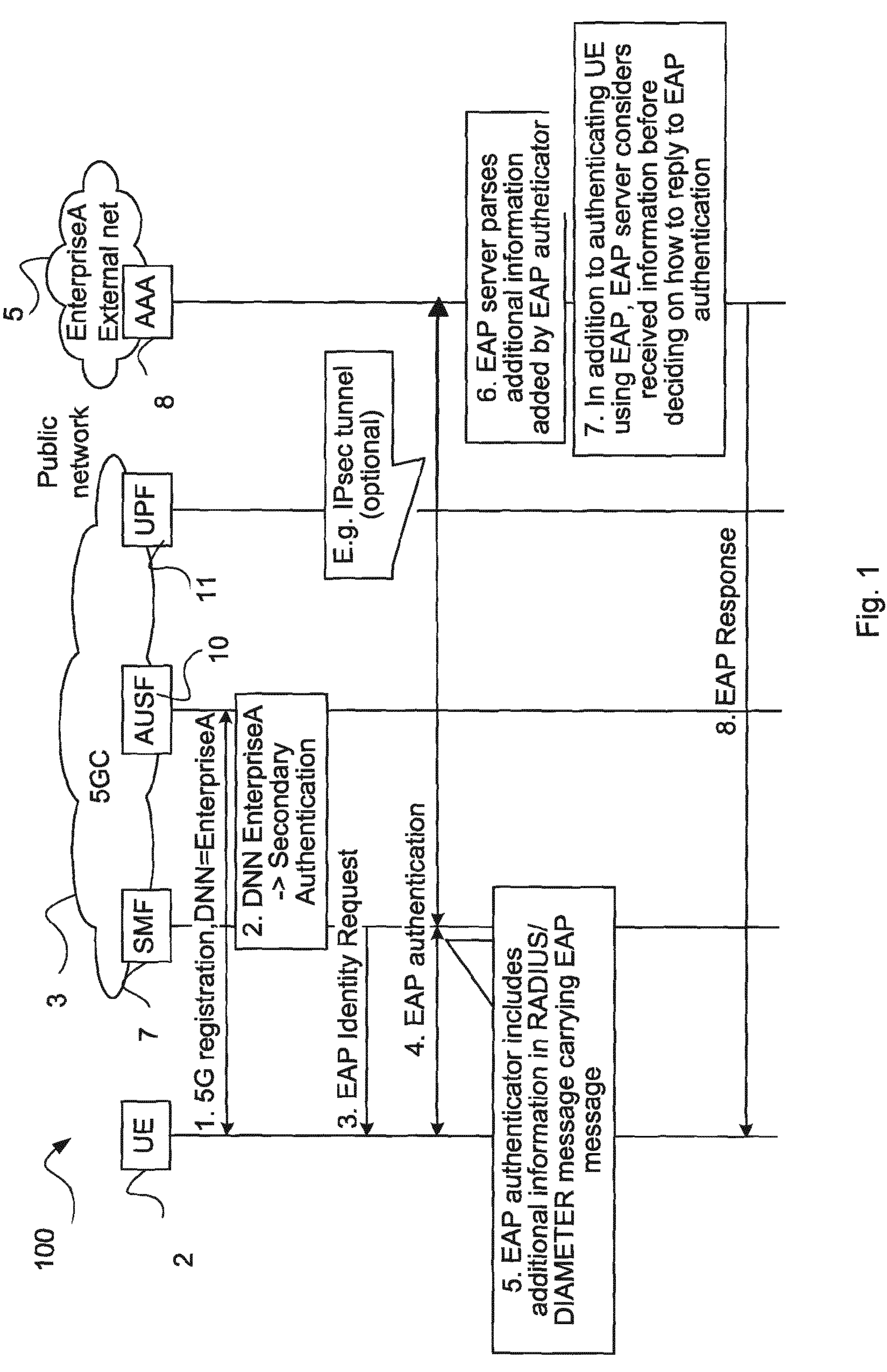
FIG. 1 is a signalling diagram according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Briefly, according to various aspects of the present teachings, additional information is included in, e.g. an EAP exchange. For instance, during the EAP exchange serving as secondary authentication between UE, SMF (acting as EAP authenticator) and AAA/EAP server in external network, the EAP authenticator in the 3GPP network (or SMF in 5G) includes additional information while carrying EAP messages to the EAP/AAA server.

Secondary authentication is run to grant access to an authorized entity (e.g. UE) to an external network (e.g. enterprise network). Currently, the only thing verified is that the UE holds valid credentials to access the external network. RADIUS and DIAMETER have many attribute value-pairs (AVPs) that can be used for sending information from the authenticator to the AAA server. This can include information such as the location of the client/peer/UE, its MAC address etc. RADIUS and DIAMETER can also be used to send AVPs from the AAA server to the authenticator. This can for example include policy and authorization information in the form of access control lists etc.

In various embodiments, an EAP authenticator (typically an SMF) in the home network of a UE, communicates additional information to an external network by including such additional information in an EAP message, which is sent to an EAP/AAA server of the external network. The additional information may, for instance, comprise location information of the UE, identifying various things such as:

- if the UE is roaming (could be just a flag indicating this)
- in which country the UE is located (could be information that is always sent, or only when roaming, e.g. Mobile Country Code (MCC).
- which operator the UE is connected to (if roaming, which visited network the UE is attached to, e.g. Mobile Network Code (MNC)+MCC or Serving Network Name (SNN).
- the tracking area (geographical area) of the operator network that the UE is located in. Implementing this would require that the external network can map the tracking area code to something it understands with respect to the location, or that the SMF translates the tracking area code information to some form of coordinates. The tracking area would typically be used for whitelisting certain locations so that the external network can be aware of those tracking areas that it is allowing connections from.
- information about other active PDU contexts of the UE/subscription. If the UE has an active context e.g. to internet, then the external network might not allow a connection to the external network simultaneously.
- used access technology (e.g. 2G, 3G, 4G, 5G) to determine what type of security is applied on the radio interface used by the UE.
- some form of historic behavior of the UE/subscription. Suspicious behavior such as multiple registrations or failed registrations etc., may result in denied access for the UE.
- other relevant information.

The home network learns the SNN, MNC, MCC during registration and primary authentication of the UE, so when secondary authentication is started the information is available at the home network. The SMF might have to request the SNN info from some other NF, e.g. AUSF if not available to it otherwise. Naturally, the home network also knows its own MNC, MCC, SNN, and tracking area codes of tracking area where UE is located, which can be used in non-roaming scenarios. Again, this information might have to be fetched from some other NF if not otherwise available to SMF.

FIG. 1 is a signalling diagram according to embodiments. A communications system 100 is also illustrated, and in particular a 5GC 3 is illustrated. The 5GC 3 comprises, inter alia, three functional units 7, 10 and 11 of the 5GC. A first functional unit is a Session Management Function (SMF) unit 7. The SMF unit 7 is in the following denoted core network node 7. The SMF core network node 7 handles control plane (CP) functions and supports session management, which in turn comprises session establishment, modification and release, allocation and management of UE IP addresses, termination of Non-access stratum (NAS) signalling related to session management, to mention a few of its tasks. A second functional unit is an Authentication Server Function (AUSF) unit 10. The AUSF unit 10 performs authentication with a UE 2. A third functional unit of the 5GC is a User Plane Function (UPF) unit 11. The UPF unit 11 handles packet routing and forwarding, performs packet inspection, handles Quality of Service (QoS) and external PDU sessions for interconnecting data networks in a 5G architecture. It is noted that the 5GC 3 may comprise still further functional units, for instance, a Policy Control Function (PCF) and/or an Access and Mobility Management Function (AMF).

The UE 2 may be allowed to access an external private network, e.g. Enterprise A to get access to an external private network 5 (in the following denoted external network 5) of the enterprise A. Although not illustrated, it is realized that the enterprise A may have several external networks. The UE 2 has a subscription with an MNO, wherein the subscription may be configured with a DNN (e.g. Enterprise A) associated with the external network 5. In addition, the UE 1 may be configured with credentials for the external network 5. The operator of the external network 5 and the MNO may have an agreement for providing the DNN and optionally for establishing a secure channel between MNO network and external network such that there is IPsec tunnel established between them, but it is noted that such IPsec tunnel is optional. The external network/enterprise may in fact consist of multiple networks that are controlled by the same entity, e.g. an Enterprise network consisting of multiple regional (enterprise) networks. The network(s) may implement software defined network (SDN) in order to, for instance, configure what resources are available for various connecting clients/sessions and/or for when to connect to the network(s) via specific gateways (GWs). In the FIG. 1 the enterprise is shown to have one external network 5, but the enterprise may have just any number of external networks. The external network 5 comprises an AAA server 8.

Secondary authentication is run in order to grant access for an authorized device, e.g. a UE, to an external network (e.g. enterprise network). Currently, the only thing verified is that the UE holds valid credentials to access the external network.

At double-headed arrow 1, the UE 2 registers with the 5GC 3, and authenticates with the AUSF 10 thereof. After registration, a PDU session establishment procedure follows between the UE and the SMF unit 10. In this procedure the UE 2 may (optionally) indicate a DNN (e.g. "EnterpriseA") that it wishes to use for the PDU session. In other embodiments, the 5GC 3 may instead select DNN for the UE 2 based on a DNN that is configured for the subscription of the UE 2. Flow then continues to box 2.

In box 2, the 5GC 3 notices that the UE PDU session is using a DNN that requires a secondary authentication with an AAA server 8 of the external network 5. A secondary authentication procedure is therefore initiated by the SMF core network node 7. Flow then continues to arrow 3.

At arrow 3, the SMF core network node 7 sends an EAP identity request towards the UE 2. Flow then continues to double-headed arrow 4.

At double-headed arrow 4, the UE 2 acts as EAP peer and, depending on the credentials, runs a suitable EAP method with the external AAA server 8. The SMF core network node 7 acts as a EAP authenticator and sends messages to the external AAA server 8 via the UPF 11. There may be an IPsec tunnel, or other secure channel, between the UPF 11, and the AAA server 8 of the enterprise A. This is however optional and may be omitted, e.g. if security requirements do not mandate secure connection between the 5GC 3 and the external network 5. Flow then continues to box 5.

In box 5, an EAP authenticator includes additional information into a RADIUS/DIAMETER message carrying one of the EAP messages towards the EAP server 8. Flow then continues to box 6.

In box 6, the EAP server 8 parses the additional information from the RADIUS/DIAMETER message. Flow then continues to box 7.

In box 7, the EAP authentication is run and, if the authentication proves to be successful, the UE 2 is authenticated. However, before sending an EAP SUCCESS message the EAP server 8 also considers any received additional information and takes it into account while deciding whether or not the UE 2 is allowed to access the external network 5.

Even if the EAP authentication is successful, the EAP server 8 may send a reject message to the UE 2 if the additional information, based on security policy of Enterprise A, indicates that the UE 2 is currently not allowed to access the external network 5. This may, for instance, be the case if the UE 2 is located in a region from which access to the external network 5 is not allowed. In this case the EAP server 8 sends a reject message indicating that the EAP authentication failed. In some embodiments, the reject massage may comprise some form of indication for why it failed, e.g. location not allowed. The reject message may be provided to the user of the UE 2 in a readable form.

If the EAP authentication is successful and a policy evaluation based on received additional information indicates that the UE 2 is allowed to connect to the external network 5, the EAP server 8 generates an EAP success message or EAP reject message. Flow then continues to arrow 8.

At arrow 8, the EAP server 8 sends the final EAP response message indicating whether the UE 2 is allowed to access the external network. That is, the EAP response is either a EAP reject message or a EAP success message.

3GPP has many Vendor-Specific attributes that can be used in RADIUS and DIAMETER messages to communicate the necessary location information. For example, 3GPP-Charging-Id, 3GPP-IMSI-MCC-MNC are sub-attributes already specified by 3GPP (in TS 29.061 clause 16.4.7), giving details about the subscription of the UE. This can be taken advantage of for implementing embodiments of the present teachings. Further, new vendor-specific attributes may be added to communicate new or more fine-grained information. For example, 3GPP-SNN (for giving SNN), or 3GPP-Serving-MNC-MCC (for MNC and MCC of serving network) to give details about network to which the UE is attached.

As has been described, additional information is included in, e.g. an EAP exchange. During the EAP exchange serving as secondary authentication between UE, SMF (acting as EAP authenticator) and AAA/EAP server in external network, the EAP authenticator in the 3GPP network (or SMF in 5G) includes additional information in one of the EAP messages to the EAP/AAA server 8.

The additional information may be selected in many different ways and may thus be selected among a number of different information related to the UE 2. As an example, the additional information may relate to the location of the UE, e.g. in form of:

- serving network name identifying the network that the UE is actually connected to,
- mobile country code, identifying the country where the UE is located, and optionally mobile network code (MNC), identifying the operator the UE is connected to, of the network serving the UE, also contained in SNN;
- even more fine-grained information about the UE, e.g. tracking area code, identifying a certain subsection of the network where the UE is connected;
- other relevant information, such as information about other active PDU context of the UE, e.g. whether there are other active PDUs, whether they then are to public network (typically internet) etc.

To aid the external EAP server 8 to make policy decisions about the UE 2, the actual location of the UE 2 can be an important piece of information. In non-roaming and local breakout scenarios the location of the UE 2 is given by the SMF core network node 7 or UPF 11 exchanging EAP messages with the EAP server 8. Whenever a UE/subscription is roaming, the home network learns the Serving Network Name (SNN) of the visited network. The SNN contains Mobile Network Code (MNC) and Mobile Country code (MCC), i.e. network and country codes of the visited network. The UE 2 also knows it since it has selected which visited network to attach, based on a list of roaming partners of the home network. Thus, the UE 2 can include this information in one of the EAP messages sent to the EAP server 8. In some embodiments, the UE 2 or the home network may also include this information outside the EAP tunnel, i.e., inside the lower layer carrying the EAP message, e.g. in RADIUS/DIAMETER attributes. A malicious UE 2 could have an incentive to spoof this information, so the home network would be a better choice for providing the information to the AAA server 8.

In the following specific methods and means are presented and which may be implemented based on the herein provided teachings.

Figure 2:
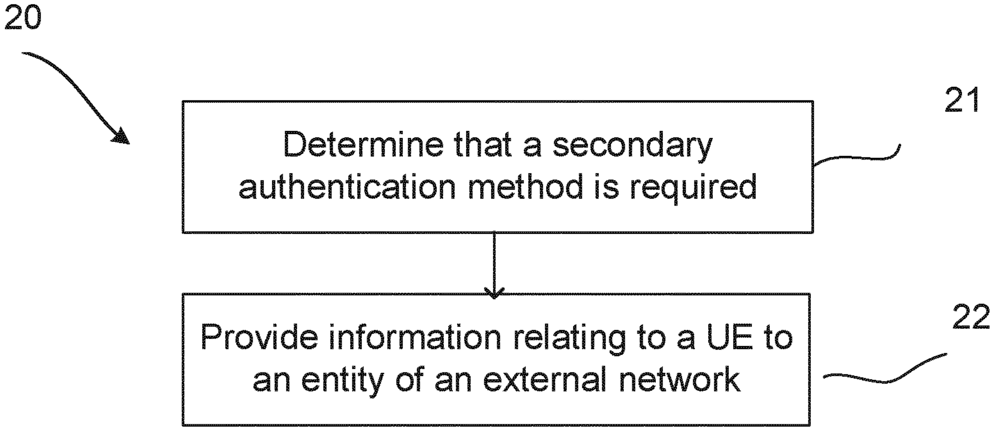
FIG. 2 is a flow chart of methods according to embodiments.

FIG. 2 is a flow chart of methods according to various embodiments. A method 20 is disclosed, in various embodiments, for providing a user equipment 2 access to an external network 5. The method 20 is performed in a core network node 7 of a Mobile Network Operator network 3. The core network node 7 may, for instance, be the SMF functional unit 7 described earlier. The AAA server 8 is typically located in the external network, and uses external network credentials of the UE, i.e. only UEs that also possess valid credentials for the external network can establish a PDU session with the DNN. The EAP exchange is run with a Session Management Function (SMF) in the 5GC acting as an EAP authenticator and (typically) the AAA server in the external network acting as an EAP server.

The SMF is a fundamental element of the 5G service-based architecture and is responsible for interacting with the decoupled data plane, creating updating and removing PDU sessions and managing session context with the User Plane Function (UPF).

The method 20 comprises determining 21 that a secondary authentication procedure is required in order for the UE 2 to access the external network 5.

The method 20 comprises providing 22, to an entity 8 of the external network 5, information relating to the UE 2. The UE related information is included in a message in relation to the secondary authentication procedure between the UE 2 and the entity 8 of the external network 5. The UE information may be sent in different ways, for instance as a message part of the secondary authentication, or as a message preceding the secondary authentication or as a message sent after the secondary authentication.

The method 20 provides several advantages. The EAP/AAA server, or the external network, is given an improved way of making an authorization decision regarding whether or not to allow the UE access to the external network. The decision is based on the additional information provided by the 3GPP network. For example, obtaining environmental attributes allow the external network to enable ABAC/PBAC (or other fine-grained access control solutions) to ensure fine-grained authorization decisions. Further, an optimization of the authorization procedure is enabled by removing the need for the exchange of additional information necessary for authorization decisions on UP level. The herein presented methods remove the need to buy and use additional hardware and software that works on the top of the 3GPP network to support the authorization decision. Providing the additional information about UE, the proposed solution will help enable ZTNA via 3GPP networks.

In an embodiment, the determining 21 is based on an indicator received from the UE 2.

In variations of the above embodiment, the indicator comprises one of: a request to connect to a specified external network 5, a DNN of the external network 5 matching configuration information requiring the secondary authentication to be made, an identity sent by the UE 2 and a subscription related to the UE 2.

In still other embodiments, the determining 21 is based on a DNN configured in a subscription tied to the UE 2 for accessing the MNO network 3.

In various embodiments, the UE related information comprises one or more of: location of the UE 2, country in which the UE 2 resides, mobile network operator to which the UE 2 is connected, tracking area of an operator network in which the UE 2 is active, information on an ongoing PDU context of the UE 2, access technology used by the UE 2, historic data on the UE 2, environmental attributes related to the UE 2, historical subject behavior pattern of the UE 2, information from threat intelligence sources, and roaming status of the UE 2. These are just a few of many other types of UE related information that can be used in the method 20.

In various embodiments, the secondary authentication procedure is based on an Extensible Authentication Protocol authentication.

In some embodiments, the core network node 7 acts as an EAP authenticator and the method 20 comprises including the UE related information in a RADIUS/DIAMETER message carrying an EAP message to the entity 8 of the external network 3.

In various embodiments, the entity 8 comprises an Authentication, Authorization and Accounting, AAA, server 8.

In another aspect, a core network node 7 of an MNO network 3 is disclosed for providing a user equipment 2 access to an external network 5. The core network node 7 is configured to:

- determine that a secondary authentication procedure is required in order for the UE 2 to access the external network 5 and
- provide, to an entity 8 of the external network 5, information relating to the UE 2, the UE related information being included in a message in relation to the secondary authentication procedure between the UE 2 and the entity 8 of the external network 5.

In an embodiment, the core network node 7 is configured to determine based on an indicator received from the UE 2.

In various variations of the above embodiment, the indicator comprises one of: a request to connect to a specified external network 5, a DNN of the external network 5 matching configuration information requiring the secondary authentication to be made, an identity sent by the UE 2 and a subscription related to the UE 2.

In further variations of the above embodiment, the core network node 7 is configured to determine based on a DNN configured in a subscription tied to the UE 2 for accessing the MNO network 3.

In various embodiments, the UE related information comprises one or more of: location of the UE 2, country in which the UE 2 resides, mobile network operator to which the UE 2 is connected, tracking area of an operator network in which the UE 2 is active, information on an ongoing PDU context of the UE 2, access technology used by the UE 2, historic data on the UE 2, environmental attributes related to the UE 2, historical subject behavior pattern of the UE 2, information from threat intelligence sources, and roaming status of the UE 2. An owner of an enterprise is enabled to select among a number of UE related information and may hence essentially tailor a preferred level of security when providing access to its private network(s).

Figure 3:
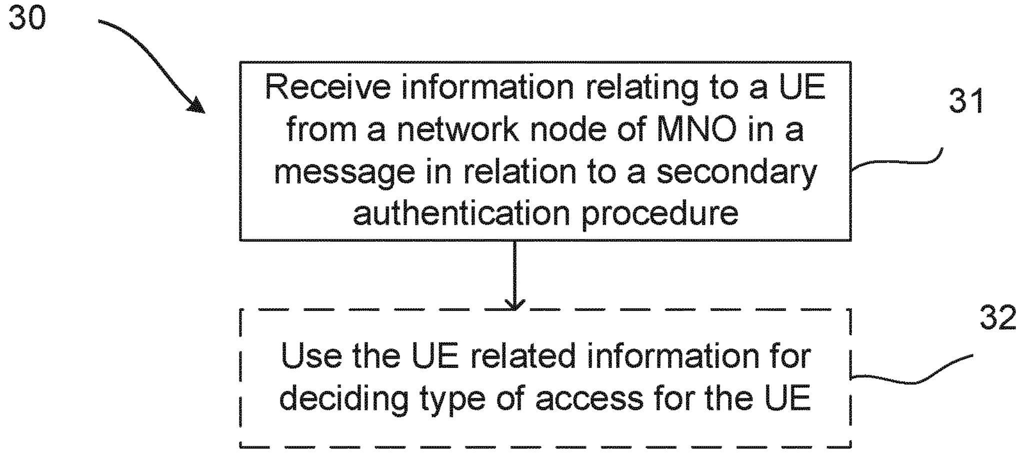
FIG. 3 is a flow chart of methods according to embodiments.

FIG. 3 is a flow chart of methods according to various embodiments. A method 30 is disclosed, in various embodiments, for providing a user equipment 2 access to an external network 5. The method 20 is performed in an entity 8 of the external network 5 and comprises receiving 31, from a core network node 7 of an MNO network 3 in which the UE 2 is registered, information relating to the UE 2. The UE related information is included in a message in relation to a secondary authentication procedure between the UE 2 and the entity 8 of the external network 5.

In a variation of the above embodiment, the method 30 comprises using the UE related information in deciding type of access for the UE 2. The type of access may in different embodiments be one or more of: complete access, no access, limited access, and Internet access.

In various embodiments, the UE related information comprises one or more of: location of the UE 2, country in which the UE 2 resides, mobile network operator to which the UE 2 is connected, tracking area of an operator network in which the UE 2 is active, information on an ongoing PDU context of the UE 2, access technology used by the UE 2, historic data on the UE 2, environmental attributes related to the UE 2, historical subject behavior pattern of the UE 2, information from threat intelligence sources, and roaming status of the UE 2.

In still another aspect, an entity 8 for providing a user equipment 2 access to an external network 5 is provided. The entity 8 is configured to: receive, from a core network node 7 of an MNO network 3 in which the UE 2 is registered, information relating to the UE 2. The UE related information is included in a message in relation to a secondary authentication procedure between the UE 2 and the entity 8 of the external network 3.

In a variation of the above embodiment, the entity 8 is configured to use the UE related information in deciding type of access for the UE 2. In different embodiments, the type of access may be one or more of: complete access, no access, limited access, and Internet access.

In various embodiments, the UE related information comprises one or more of: location of the UE 2, country in which the UE 2 resides, mobile network operator to which the UE 2 is connected, tracking area of an operator network in which the UE 2 is active, information on an ongoing PDU context of the UE 2, access technology used by the UE 2, historic data on the UE 2, environmental attributes related to the UE 2, historical subject behavior pattern of the UE 2, information from threat intelligence sources, and roaming status of the UE 2.

Figure 4:
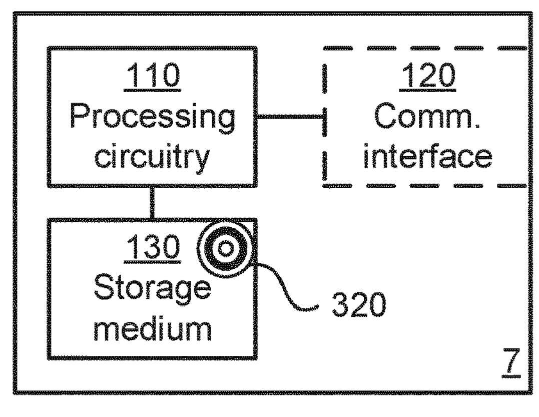
FIG. 4 is a schematic diagram showing functional units of an entity according to an embodiment.
Figure 8:
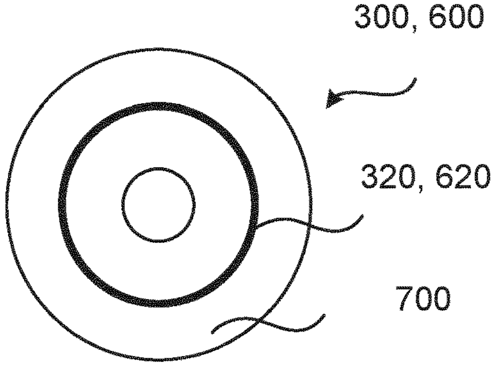
FIG. 8 shows one example of a computer program product comprising computer readable means according to an embodiment.

FIG. 4 schematically illustrates, in terms of a number of functional units, the components of core network node 7 according to an embodiment. Processing circuitry 110 is provided using any combination of one or more of a suitable central processing unit (CPU), multiprocessor, microcontroller, digital signal processor (DSP), etc., capable of executing software instructions stored in a computer program product 300 (as in FIG. 8), e.g. in the form of a storage medium 130. The processing circuitry 110 may further be provided as at least one application specific integrated circuit (ASIC), or field programmable gate array (FPGA).

Particularly, the processing circuitry 110 is configured to cause the core network node 7 to perform a set of operations, or steps, as disclosed above. For example, the storage medium 130 may store the set of operations, and the processing circuitry 110 may be configured to retrieve the set of operations from the storage medium 130 to cause the core network node 7 to perform the set of operations. The set of operations may be provided as a set of executable instructions.

The processing circuitry 110 is thereby arranged to execute methods as herein disclosed. The storage medium 130 may also comprise persistent storage, which, for example, can be any single one or combination of magnetic memory, optical memory, solid state memory or even remotely mounted memory. The core network node 7 may further comprise a communications interface 120 for communications with other entities, nodes, functions, and devices of the system 100. As such the communications interface 120 may comprise one or more transmitters and receivers, comprising analogue and digital components. The processing circuitry 110 controls the general operation of the core network node 7 e.g. by sending data and control signals to the communications interface 120 and the storage medium 130, by receiving data and reports from the communications interface 120, and by retrieving data and instructions from the storage medium 130. Other components, as well as the related functionality, of the core network node 7 are omitted in order not to obscure the concepts presented herein.

Figure 5:
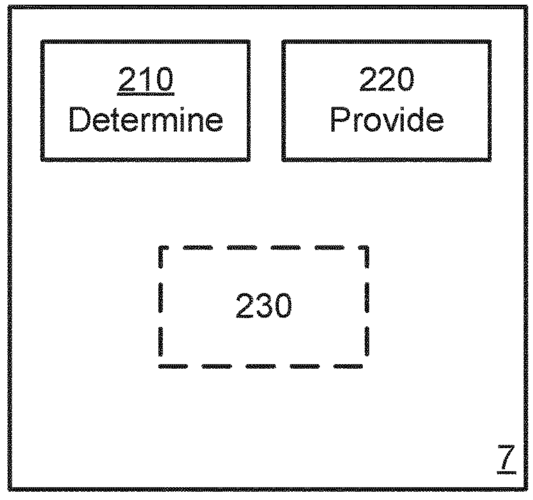
FIG. 5 is a schematic diagram showing functional modules of an entity according to an embodiment.

FIG. 5 schematically illustrates, in terms of a number of functional modules, the components of core network node 7 according to an embodiment. The core network node 7 of FIG. 5 comprises a number of functional modules; a determine module 210 configured to perform step 21 and a provide module 220 configured to perform step 22. The core network node 7 of FIG. 5 may further comprise a number of optional functional modules, as represented by functional module 230. In general terms, each functional module 210, 220, 230 may in one embodiment be implemented only in hardware and in another embodiment with the help of software, i.e., the latter embodiment having computer program instructions stored on the storage medium 130 which when run on the processing circuitry makes the core network node 7 perform the corresponding steps mentioned above. It should also be mentioned that even though the modules correspond to parts of a computer program, they do not need to be separate modules therein, but the way in which they are implemented in software is dependent on the programming language used. Preferably, one or more or all functional modules 210, 220, 230 may be implemented by the processing circuitry 110, possibly in cooperation with the communications interface 120 and/or the storage medium 130. The processing circuitry 110 may thus be configured to from the storage medium 130 fetch instructions as provided by a functional module 210, 220, 230 and to execute these instructions, thereby performing any actions as disclosed herein.

The core network node 7 may, typically, be provided as a standalone device, but may also be implemented as a part of at least one further device. Alternatively, functionality of the core network node 7 may be distributed between at least two devices, or nodes. These at least two nodes, or devices, may either be part of the same network part or may be spread between at least two such network parts. In general terms, instructions that are required to be performed in real time may be performed in a device, or node, operatively closer to the core network node 7 than instructions that are not required to be performed in real time. A first portion of the instructions performed by the core network node 7 may be executed in a first device, and a second portion of the of the instructions performed by the core network node 7 may be executed in a second device; the herein disclosed embodiments are not limited to any particular number of devices on which the instructions performed by the core network node 7 may be executed. Hence, the methods according to the herein disclosed embodiments are suitable to be performed by a core network node 7 residing in a cloud computational environment. Therefore, although a single processing circuitry 210 is illustrated in FIG. 4 the processing circuitry 110 may be distributed among a plurality of devices, or nodes. The same applies to the functional modules 210, 220, 230, of FIG. 5 and the computer program 320 of FIG. 8.

Figure 6:
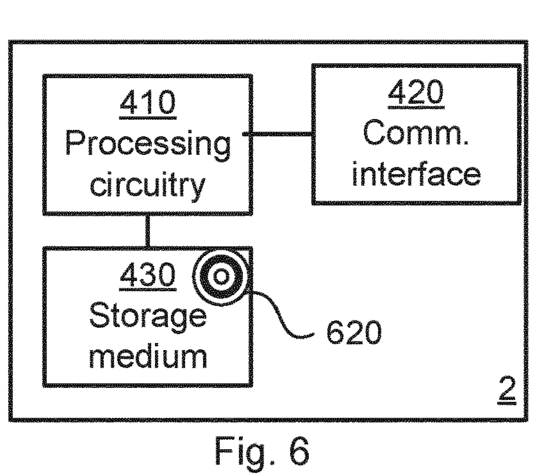
FIG. 6 is a schematic diagram showing functional units of a user equipment according to an embodiment.

FIG. 6 schematically illustrates, in terms of a number of functional units, the components of a user equipment 2 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 600 (as in FIG. 8), e.g. in the form of a storage medium 430. The processing circuitry 410 may further be provided as at least one application specific integrated circuit (ASIC), or field programmable gate array (FPGA).

Particularly, the processing circuitry 410 is configured to cause the user equipment 2 to perform a set of operations, or steps, as disclosed above. For example, the storage medium 430 may store the set of operations, and the processing circuitry 410 may be configured to retrieve the set of operations from the storage medium 430 to cause the user equipment 2 to perform the set of operations. The set of operations may be provided as a set of executable instructions.

The processing circuitry 410 is thereby arranged to execute methods as herein disclosed. The storage medium 430 may also comprise persistent storage, which, for example, can be any single one or combination of magnetic memory, optical memory, solid state memory or even remotely mounted memory. The user equipment 2 may further comprise a communications interface 420 for communications with other entities, nodes, functions, and devices of the system 100. As such the communications interface 420 may comprise one or more transmitters and receivers, comprising analogue and digital components. The processing circuitry 410 controls the general operation of the user equipment 2 e.g. by sending data and control signals to the communications interface 420 and the storage medium 430, by receiving data and reports from the communications interface 420, and by retrieving data and instructions from the storage medium 430. Other components, as well as the related functionality, of the user equipment 2 are omitted in order not to obscure the concepts presented herein.

Figure 7:
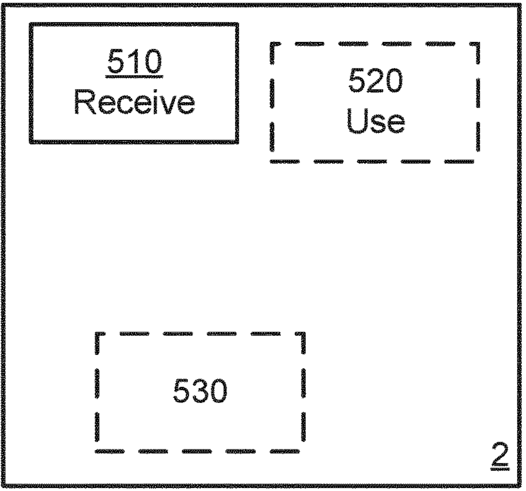
FIG. 7 is a schematic diagram showing functional modules of a user equipment according to an embodiment.

FIG. 7 comprises a number of functional modules; a receive module 510 configured to perform step 31. The user equipment 2 of FIG. 7 may further comprise a number of optional functional modules, as represented by functional modules 520 and 530. Functional module 520 may be a use module, configured to perform step 32. In general terms, each functional module 510, 520, 530 may in one embodiment be implemented only in hardware and in another embodiment with the help of software, i.e., the latter embodiment having computer program instructions stored on the storage medium 430 which when run on the processing circuitry makes the user equipment 2 perform the corresponding steps mentioned above. It should also be mentioned that even though the modules correspond to parts of a computer program, they do not need to be separate modules therein, but the way in which they are implemented in software is dependent on the programming language used. Preferably, one or more or all functional modules 510, 520, 530 may be implemented by the processing circuitry 410, possibly in cooperation with the communications interface 420 and/or the storage medium 430. The processing circuitry 410 may thus be configured to from the storage medium 430 fetch instructions as provided by a functional module 510, 520, 530 and to execute these instructions, thereby performing any actions as disclosed herein.

The user equipment 2 is typically provided as a standalone device but may also be implemented as a part of at least one further device, wherein the user equipment 2 and the at least one further device performs the method in cooperation. The hardware of the user equipment 2 may comprise a radio interface 420 configured to set up and maintain wireless connection with a core network node 7 service in a coverage area in which the user equipment 2 is currently located. Hardware of the user equipment 2 may further comprise the processing circuitry 410, which may comprise one or more programmable processors, application-specific integrated circuits, field programmable gate arrays or combination of these adapted for execute instructions. The user equipment 2 also comprises software, which may be stored in or be accessible by the user equipment 2 and executable by the processing circuitry 410.

In general terms, instructions that are required to be performed in real time may be performed in a device, or node, operatively closer to the user equipment 2 than instructions that are not required to be performed in real time. A first portion of the instructions performed by the user equipment 2 may be executed in the user equipment 2, and a second portion of the of the instructions performed by the further device. Therefore, although a single processing circuitry 410 is illustrated in FIG. 6 the processing circuitry 410 may be distributed among a plurality of devices. The same applies to the functional modules 510, 520, 530, of FIG. 7 and the computer program 620 of FIG. 8.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for providing a user equipment (UE) access to an external network, the method being performed in a core network node of a Mobile Network Operator (MNO) network and comprising:

determining that a secondary authentication procedure is required in order for the UE to access the external network, and providing, to an entity of the external network, information relating to the UE, the UE related information being included in a message in relation to the secondary authentication procedure between the UE and the entity of the external network, wherein the UE related information comprises one or more of: location of the UE, country in which the UE resides, mobile network operator to which the UE is connected, tracking area of an operator network in which the UE is active, access technology used by the UE, historic data on the UE, environmental attributes related to the UE, historical subject behavior pattern of the UE, information from threat intelligence sources, and roaming status of the UE.

2. The method as claimed in claim 1, wherein the determining is based on an indicator received from the UE.

3. The method as claimed in claim 2, wherein the indicator comprises one of: a request to connect to a specified external network, a Data Network Name (DNN) of the external network matching configuration information requiring the secondary authentication to be made, an identity sent by the UE and a subscription related to the UE.

4. The method as claimed in claim 1, wherein the determining is based on a DNN configured in a subscription tied to the UE for accessing the MNO network.

5. The method as claimed in claim 1, wherein the secondary authentication procedure is based on an Extensible Authentication Protocol (EAP) authentication.

6. The method as claimed in claim 5, wherein the core network node acts as an EAP authenticator and the method comprises including the UE related information in a RADIUS/DIAMETER message carrying an EAP message to the entity of the external network.

7. The method as claimed in claim 1, wherein the entity comprises an Authentication, Authorization and Accounting, AAA, server.

8. A core network node of a Mobile Network Operator (MNO) network for providing a user equipment (UE) access to an external network, the core network node being configured to:

determine that a secondary authentication procedure is required in order for the UE to access the external network, and provide, to an entity of the external network, information relating to the UE, the UE related information being included in a message in relation to the secondary authentication procedure between the UE and the entity of the external network, wherein the UE related information comprises one or more of: location of the UE, country in which the UE resides, mobile network operator to which the UE is connected, tracking area of an operator network in which the UE is active, access technology used by the UE, historic data on the UE, environmental attributes related to the UE, historical subject behavior pattern of the UE, information from threat intelligence sources, and roaming status of the UE.

9. A method for providing a user equipment (UE) access to an external network, the method being performed in an entity of the external network, and comprising:

receiving, from a core network node of a Mobile Network Operator (MNO) network in which the UE is registered, information relating to the UE, the UE related information being included in a message in relation to a secondary authentication procedure between the UE and the entity of the external network, wherein the UE related information comprises one or more of: location of the UE, country in which the UE resides, mobile network operator to which the UE is connected, tracking area of an operator network in which the UE is active, access technology used by the UE, historic data on the UE, environmental attributes related to the UE, historical subject behavior pattern of the UE, information from threat intelligence sources, and roaming status of the UE.

10. The method as claimed in claim 9, comprising using the UE related information in deciding type of access for the UE.

11. The method as claimed in claim 10, wherein the type of access is one or more of: complete access, no access, limited access, Internet access.

12. An entity for providing a user equipment (UE) access to an external network, the entity being configured to:

receive, from a core network node of a Mobile Network Operator (MNO) network in which the UE is registered, information relating to the UE, the UE related information being included in a message in relation to a secondary authentication procedure between the UE and the entity of the external network, wherein the UE related information comprises one or more of: location of the UE, country in which the UE resides, mobile network operator to which the UE is connected, tracking area of an operator network in which the UE is active, access technology used by the UE, historic data on the UE, environmental attributes related to the UE, historical subject behavior pattern of the UE, information from threat intelligence sources, and roaming status of the UE.

13. The method as claimed in claim 1, wherein the UE related information comprises location of the UE.

14. The method as claimed in claim 1, wherein the UE related information comprises country in which the UE resides.

15. The method as claimed in claim 1, wherein the UE related information comprises mobile network operator to which the UE is connected.

16. The method as claimed in claim 1, wherein the UE related information comprises tracking area of an operator network in which the UE is active.

17. The method as claimed in claim 1, wherein the UE related information comprises historic data on the UE or historical subject behavior pattern of the UE.

18. The method as claimed in claim 1, wherein the UE related information comprises environmental attributes related to the UE.

19. The method as claimed in claim 1, wherein the UE related information comprises information from threat intelligence sources.

20. The method as claimed in claim 1, wherein the UE related information comprises roaming status of the UE.

* * * * *